United States Patent
Romanenko

(10) Patent No.: US 9,892,517 B2
(45) Date of Patent: Feb. 13, 2018

(54) SENSOR NOISE PROFILE

(71) Applicant: APICAL LIMITED, Cambridge (GB)

(72) Inventor: Ilya Romanenko, Leicestershire (GB)

(73) Assignee: Apical Ltd., Cambridge (GB)

( * ) Notice: Subject to any disclaimer, the term of this patent is extended or adjusted under 35 U.S.C. 154(b) by 0 days.

(21) Appl. No.: 14/973,937

(22) Filed: Dec. 18, 2015

(65) Prior Publication Data

US 2016/0180541 A1 Jun. 23, 2016

(30) Foreign Application Priority Data

Dec. 19, 2014 (GB) .................................. 1422787.0

(51) Int. Cl.
| | |
|---|---|
| *G06T 7/00* | (2017.01) |
| *G06K 9/00* | (2006.01) |
| *G06K 9/40* | (2006.01) |
| *G06T 5/00* | (2006.01) |
| *G06K 9/46* | (2006.01) |
| *G06T 7/13* | (2017.01) |

(52) U.S. Cl.
CPC .......... *G06T 7/0085* (2013.01); *G06K 9/0051* (2013.01); *G06K 9/40* (2013.01); *G06K 9/4604* (2013.01); *G06T 5/002* (2013.01); *G06T 7/13* (2017.01); *G06T 2200/28* (2013.01); *G06T 2207/10024* (2013.01); *G06T 2207/20024* (2013.01); *G06T 2207/20192* (2013.01)

(58) Field of Classification Search
CPC .......... G06T 7/0085; G06T 7/13; G06T 7/80; G06T 7/149; G06T 5/002; G06T 2207/20192; G06T 2200/28; G06T 2207/20024; G06T 2207/10024; G06K 9/4604; G06K 9/40; G06K 9/0051
USPC ......................................................... 382/103
See application file for complete search history.

(56) References Cited

U.S. PATENT DOCUMENTS

| | | | |
|---|---|---|---|
| 2007/0206885 A1 | 9/2007 | Wen | |
| 2007/0262574 A1* | 11/2007 | Breed | B60R 1/00 280/735 |
| 2007/0297019 A1 | 12/2007 | Foi et al. | |
| 2008/0267530 A1* | 10/2008 | Lim | H04N 5/235 382/284 |
| 2010/0310190 A1 | 12/2010 | Lin | |
| 2011/0102647 A1 | 5/2011 | Kim et al. | |
| 2011/0176744 A1* | 7/2011 | Ko | G06T 3/4007 382/264 |

(Continued)

FOREIGN PATENT DOCUMENTS

WO 2014144443 A1 9/2014

OTHER PUBLICATIONS

Antoni Buades, Bartomeu Coll and Jean-Michel Morel, "Nonlocal image and movie denoising" International Journal of Computer Vision vol. 76, No. 2, 123-139, (2008).

(Continued)

*Primary Examiner* — Amandeep Saini
(74) *Attorney, Agent, or Firm* — EIP US LLP

(57) ABSTRACT

The invention relates to feature extraction technique based on edge extraction. It can be used in computer vision systems, including image/facial/object recognition systems, scene interpretation, classification and captioning systems. A model or profile of the noise in the sensor is used to improve feature extraction or object detection on an image from a sensor.

18 Claims, 5 Drawing Sheets

(56) References Cited

U.S. PATENT DOCUMENTS

| | | | |
|---|---|---|---|
| 2013/0129143 A1* | 5/2013 | Chen | G06K 9/6218 382/103 |
| 2013/0135496 A1 | 5/2013 | Nomura | |
| 2014/0218540 A1 | 8/2014 | Geiss et al. | |
| 2014/0267829 A1* | 9/2014 | McMahon | H04N 5/243 348/229.1 |

OTHER PUBLICATIONS

Ce Liu, William T. Freeman "A High-Quality Video Denoising Algorithm based on Reliable Motion Estimation", European Conference on Computer Vision (2010).

Ren Ying, Chua Chin-Seng, Ho Yeong-Khing, "Statistical background modeling for non-stationary camera". Pattern Recognition Letters, 24, 183-196. (2002).

Sheikh Y., Shah M., "Bayesian modeling of dynamic scenes for object detection". IEEE transactions on pattern analysis and machine intelligence, 27(11), 1778-92, (2005).

I. V. Romanenko, E. A. Edirisinghe, D. Larkin, "Block matching noise reduction method for photographic images applied in Bayer RAW domain and optimized for real-time implementation", Proceedings of SPIE vol. 8437, 84370F (2012).

Moctezuma, D.; Conde, C.; de Diego, I.M.; Cabello, E., "Person detection in surveillance environment with HoGG: Gabor filters and Histogram of Oriented Gradient," Computer Vision Workshops (ICCV Workshops), 2011 IEEE International Conference on, vol., No., pp. 1793,1800, Nov. 6-13, 2011.

N. Dalai, B. Triggs, "Histograms of oriented gradients for human detection", in: CVPR, pp. 886-893, (2005).

W. Jiang, K.-M. Lam, T. Shen, "Efficient edge detection using simplified Gabor wavelets", IEEE Trans. Syst. Man Cybern. Part B 39 (4) 1036-1047, (2009).

V.Kruger, G.Sommer, "Gabor wavelet networks for efficient head pose estimation", Image Vision Comput.20 (9-10) 365-672, (2002).

Q. Zhu, M.-C.Yeh, K.-T.Cheng, S. Avidan, "Fast human detection using a cascade of histograms of oriented gradients", in: CVPR, pp. 1491-1498, (2006).

Foi A. M., Trimeche V., Katkovnik, K. Egiazarian, "Practical Poissonian-Gaussian noise modeling and fitting for single mage raw-data", IEEE Transactions on Image Processing vol. 17, (2008).

Liu, C., W.T. Freeman, R. Szeliski, and S.B. Kang, "Noise estimation from a single image", Proc. IEEE Conf. Computer Vision and Pattern Recognition, CVPR 2006, pp. 901-908, (2006).

Blanksby, A.J., M.J. Loinaz, D.A. Inglis, and B.D. Ackland, "Noise performance of a color CMOS photogate image sensor", IEEE Int. Electron Devices Meeting 97 Tech. Dig., pp. 205-208, (1997).

Vladimir S. Petrovic, Costas S. Xydeas, "Sensor noise effects on signal-level image fusion performance", Information Fusion—INFFUS, vol. 4, No. 3, pp. 167-183, 2003.

* cited by examiner

SENSOR NOISE PROFILE

CROSS-REFERENCE TO RELATED APPLICATIONS

This application is based on, and claims priority to GB Application No. GB 1422787.0, filed Dec. 19, 2014, the entire contents of which being fully incorporated herein by reference.

BACKGROUND OF THE INVENTION

1. Field of the Invention

The field of the invention relates to methods of feature extraction, such as edge detection. It can be used in computer vision systems, including image/facial/object detection/recognition systems, scene interpretation, classification and captioning systems.

2. Technical Background

Most of the existing object detection algorithms are based on machine learning classifiers, which in their turn use features extracted from an image. Fundamentally there are two approaches to enhance the results of an object detection algorithm. The first approach is an enhancement of classification methodology, where many techniques have been proposed in the literature (Linear classifiers, Neural networks etc.). The second approach is an enhancement of features used. Researches who focus their work on the enhancement of features extracted from an image mostly concentrate on finding the set of discrete primitives describing the image content. The process of feature extraction is usually related to filtering of the image data and normalisation of the filter's response. However, there is one common flaw in most feature extraction techniques, i.e., during the normalisation and accumulation of image features the assumption is made that the filters producing a stronger response represents stronger image features. In practice, research is often being carried out with digital video or photographic images that are products of image processing pipelines, processing the image sensor data with unknown settings. As previously discussed, such processing can significantly alter image data, breaking linear dependencies between parts of an image and unbalancing the appearance of different image elements.

This invention provides a solution for a more robust edge detection method by taking sensor characteristics into account during edge detection. The method may be used for feature extraction or feature detection.

3. Discussion of Related Art

The research being conducted at present in the object detection and classification area is very intense. There are a number of object detection techniques, among which HOG-SVM and CNN are widely used.

One of the most successful object detection techniques is known as Histogram of Oriented Gradients—Support Vector Machine (HOG-SVM) as described in [1-5]. The results produced by object detection algorithms are continuously improving. The first step in the calculation of Histogram of Oriented Gradients is edge detection. Standard approaches are presented in [6-10].

A Convolutional Neural Network (CNN) is a type of feed-forward artificial neural network (ANN) where the individual neurons are tiled in such a way that they respond to overlapping regions in the visual field. When used for image recognition, convolutional neural networks (CNNs) consist of multiple layers of small neuron collections which look at small portions of the input image, called receptive fields. The results of these collections are then tiled so that they overlap to obtain a better representation of the original image; this is repeated for every such layer. The layers form a hierarchical system in which the first layers look for lower level features; this is accomplished by means of convolution between a filter and an image.

Existing approaches that assume the object detection algorithm will run on recorded video or still image present a number of issues. First, object detection always needs image processing system to produce a quality RGB image or video sequence, which in many cases means increased system complexity. Secondly the object detection algorithms assume no knowledge about image source, as the image processing settings are not known. Therefore the performance of object detection algorithms may deteriorate quickly in low light conditions.

SUMMARY OF THE INVENTION

The invention is a method of extracting a feature from an image, comprising the processor or circuitry implemented steps of:

(a) providing a digital image from a sensor;

(b) using a model or profile of the noise in the sensor to improve feature extraction or object detection on the image.

Optional implementation features include any one or more of the following:

the feature is an edge.

the feature is a local binary pattern.

the model or profile of the sensor noise is used to normalize feature extraction response.

the sensor noise in defined areas of the image are used to normalize feature extraction response.

the feature extraction or object detection is based on edge detection.

for each pixel of the input image, an edge response for an orientation is calculated and normalized by taken into account the noise variance.

the method is implemented in a system that is not part of, does not use, or is not downstream of, an image processing pipeline.

the method is operating in the RAW domain with linear data.

the edge response is calculated by convoluting a filter kernel with the intensity of the image.

the filter is a Gabor filter or a CNN filter.

the normalization of the edge response for an orientation a is calculated for each pixel (x,y) in the image from:

$$E^{\alpha}_{norm}(x, y) = \frac{E^{\alpha}(x, y)}{\Sigma_{i,k \in K}\sigma(x+i, y+k) \times G_K(x+i, y+k)}$$

wherein the response $E^{\alpha}$ (x,y) is calculated from $$E^{\alpha}(x,y)=|\Sigma_{i,k \in K}G_{sin}^{\alpha}{}_{(x+i,y+k)} \times I(x+i,y+k)|+|\Sigma_{i,k \in K}G_{cos}^{\alpha}{}_{(x+i,y+k)} \times I(x+i,y+k)|$$

the input image is the RAW image sensor data.

the image edge response is fed into a linear classifier such as an SVM or into a classification layer of a CNN.

the method is implemented in real-time.

the method is operating as a computer vision system, applied to posture detection, people detection, object detection.

the method is used in one of the following: Smartphone; Computer vision systems; Objects recognition systems; Human detection systems; Facial recognition systems;

Scene interpretation systems; Image classification systems; Image captioning systems; Autonomous vehicle computer vision systems; Robotics computer vision systems.

the method implemented in embedded hardware, such as a hardware block.

According to another aspect of the invention, there is provided an image processing hardware configured to receive a digital image from a sensor and use a model or profile of the noise in the sensor to improve feature extraction or object detection on the image.

According to another aspect of the invention, there is provided a device including image processing hardware configured to receive a digital image from a sensor and use a model or profile of the noise in the sensor to improve feature extraction or object detection on the image.

The device may be or may include one of the following: Smartphone; Computer vision system; Objects recognition system; Human detection system; Facial recognition system; Scene interpretation system; Image classification system; Image captioning system; Autonomous vehicle computer vision system; Robotics computer vision system.

BRIEF DESCRIPTION OF THE DRAWINGS

The above and other aspects of the invention will now be described, by way of example only, with reference to the following Figures, in which.

DETAILED DESCRIPTION

Figure 1:
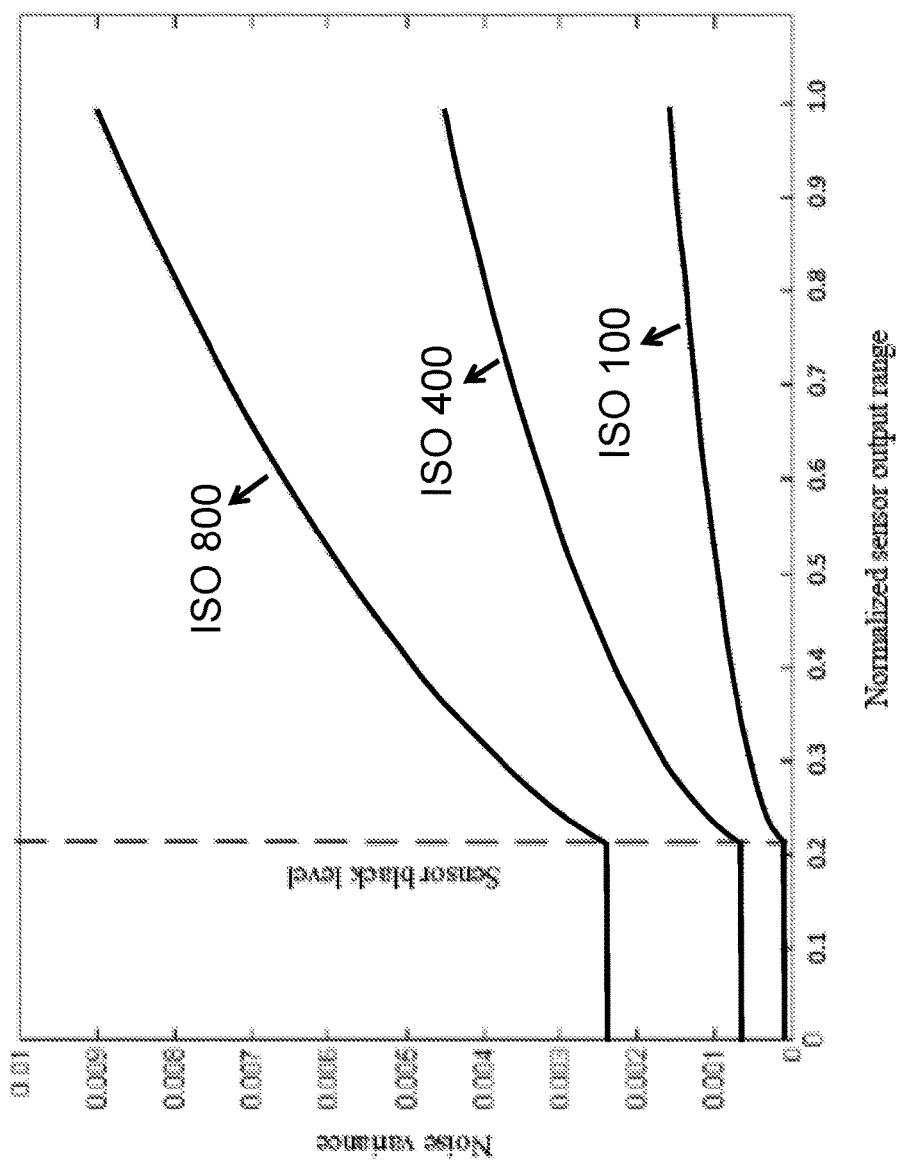
FIG. 1 represents the corresponding noise curves for a particular sensor.

Sensor Noise modelling may be used in edge detection to improve the performance of an object detection algorithm.
Noise Characteristics The effect of noise added to an image is now discussed. It has been previously investigated by other researches that the additive noise model is generally applicable for describing the noise of an image sensor. It has been also proven that the actual sensor noise fits the Gaussian and Poissonian random processes model very well. The image data representing the actual scene image sampled by the sensor without noise added to the image is defined as $I_p(x,y, t)$. The ideal image data $I_p(x,y, t)$ is a function of coordinates x,y and t. Two dimensional coordinates x,y are denoted as v for the compactness of equations, therefore the ideal image data is to be defined as $I_p(v,t)$. Noise of different natures is assumed: analogue noise $n_a(v,t)$, originating from analogue circuits and added to the image data, fixed pattern noise (FPN) $n_{fpn}(v)$, originating from multiplexors and sensor defects therefore not being a function of time, and photon noise $n_q(v,t)$, also known as a shot noise that is added to the image data $I_p(v,t)$, captured at time t and is sampled by the sensor as follows:

$$I_s(v,t)=I_p(v,t)+n_a(v,t)+n_{fpn}(v)+n_q(I_p(v,t)) \quad (1)$$

It is assumed that noise has a random nature and can be represented by a zero mean random process, therefore it can be removed by averaging data and noise. The expectation is that the signal and the noise are not correlated, and that image data are represented by some regular patterns, so that correlation functions of image data between different parts of the image can be found. If data and noise are not correlated, the selection of averaging kernels should allow us to preserve the details while reducing the amount of noise.

The Gaussian noise, usually produced by analogue circuits $n_a(v,t)$ has a thermal nature and can be approximated by a zero mean Gaussian random process. Analogue noise does not depend on characteristics of light, and is added to the useful image data by analogue sensor components. A Gaussian distribution with a standard deviation of $\sigma_a$ is used to characterize the analogue noise.

Further, sensor defects affect the level of resulting noise. Common sensor defects found in many sensors are namely, line, column and fixed pattern noise. Line and column noise can be characterized using a Gaussian noise distribution, applied in each dimension x and y with corresponding standard deviations $\sigma_{ax}$ and $\sigma_{ay}$. Fixed pattern noise can be characterized by using a Gaussian noise distribution $\sigma_{fpn}$ which is fixed over the time. Sensor defects can be considered as an addition to analogue noise $n_a(v,t)$.

Another source of noise present in a typical imaging sensor is photon noise $n_q(I_p(v,t))$, which increases as the light level increases, due to a larger numbers of photons captured by the sensor. This noise source can be described as a random process with a Poissonian distribution with standard deviation $\sigma_q$. It is assumed that $I_s(v,t) \cong I_p(v,t)$, which in practice means that the signal is stronger than noise. According to that assumption it can be put $n_q(I_p(v,t)) \cong n_q(I_s(v,t))$. The proposed system architecture can benefit from the knowledge of sensor noise characteristics. Sensor noise modelling was investigated in [11-14] and standard deviation for sensor noise can be defined as follows:

$$\sigma^2(v, t) = \sigma_a^2 + \sigma_q^2 \times \frac{I_s(v, t)}{I_{max}} \quad (2)$$

where Imax is a maximum level of intensity captured by the sensor. The standard deviation of sensor noise vs the intensity of the light captured by the sensor was calculated at different analogue gain values: 1, 4, and 8 times. The sensitivity of the sensors used in our experiments, corresponds to ISO100 at an analogue gain of 1, ISO400 at a gain of 4 and ISO800 at a gain of 8, as standard. The corresponding noise curves for the sensor AS3372, (resolution: 2M, Capture rate 60 fps, Data bits: 12, sensor active area size 4.6×3.4 mm, pixel size 2.7 u, Max S/N ratio: 59 dB), are represented in FIG. 1.

Figure 2:
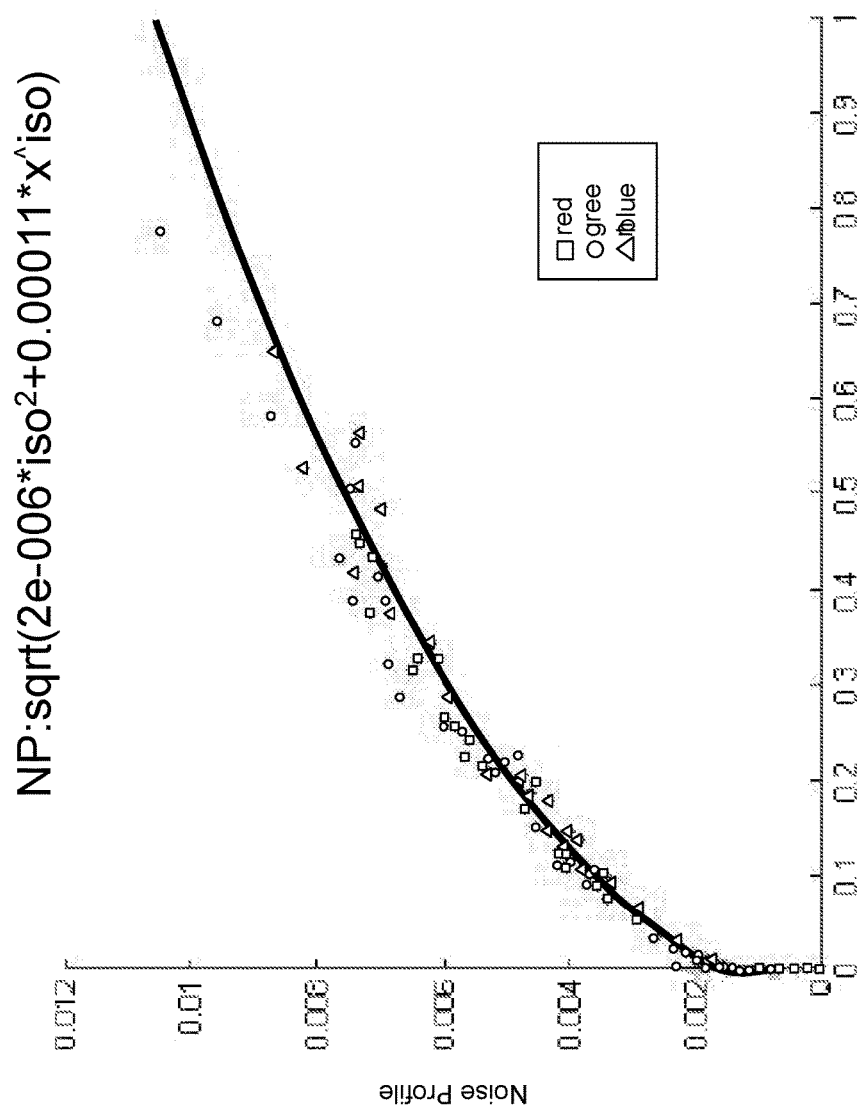
FIG. 2 shows the noise profile experimentally measured for a particular sensor.

Further the precision of equation (2) can be illustrated by the scatter plot and the best-fit graph illustrated in FIG. 2.

In FIG. 2, red, green and blue dots (shown as squares, circles, triangle) represent noise variances for the corresponding pixel colours, measured at different light intensities. The above graph is usually referred to as a sensor noise profile. The noise profile presented in FIG. 2 was experimentally measured for a sensor AS3372 at ISO100. The values of $\sigma_a^2$ and $\sigma_q^2$ characterize the noise characteristics of a sensor and being used in equation (2) can provide the estimation of a noise for each pixel at given ISO settings.

The possibility of running object detection algorithms on sensor data directly and using the sensor characterization to improve object detection quality has not previously been investigated.

Edge Detection

The edge features used by the Histogram of Oriented Gradients are extracted in Bayer RAW data domain, whilst a sensor noise model is used to perform the filter's response normalization. Experiments have been conducted that prove that the quality of edge feature extraction could be improved, compared to traditional methods of HOG feature extraction.

The edge detection normalisation technique improves object detection reliability. The algorithm may perform edge detection on sensor data directly, thus allowing object detection to be implemented on camera without requiring the image-processing pipeline.

Methods and algorithms developed in previous research were used to improve the quality of the feature extraction functional block in an object detection system. An important outcome of the proposed solution is that the object detection system proposed does not require an image-processing pipeline. That makes the whole system more compact and allows building an object detection camera which does not produce video.

The proposed system may be used to produce an embedded object detection system, implemented as a hardware block.

Image Processing Pipelines

Figure 3:
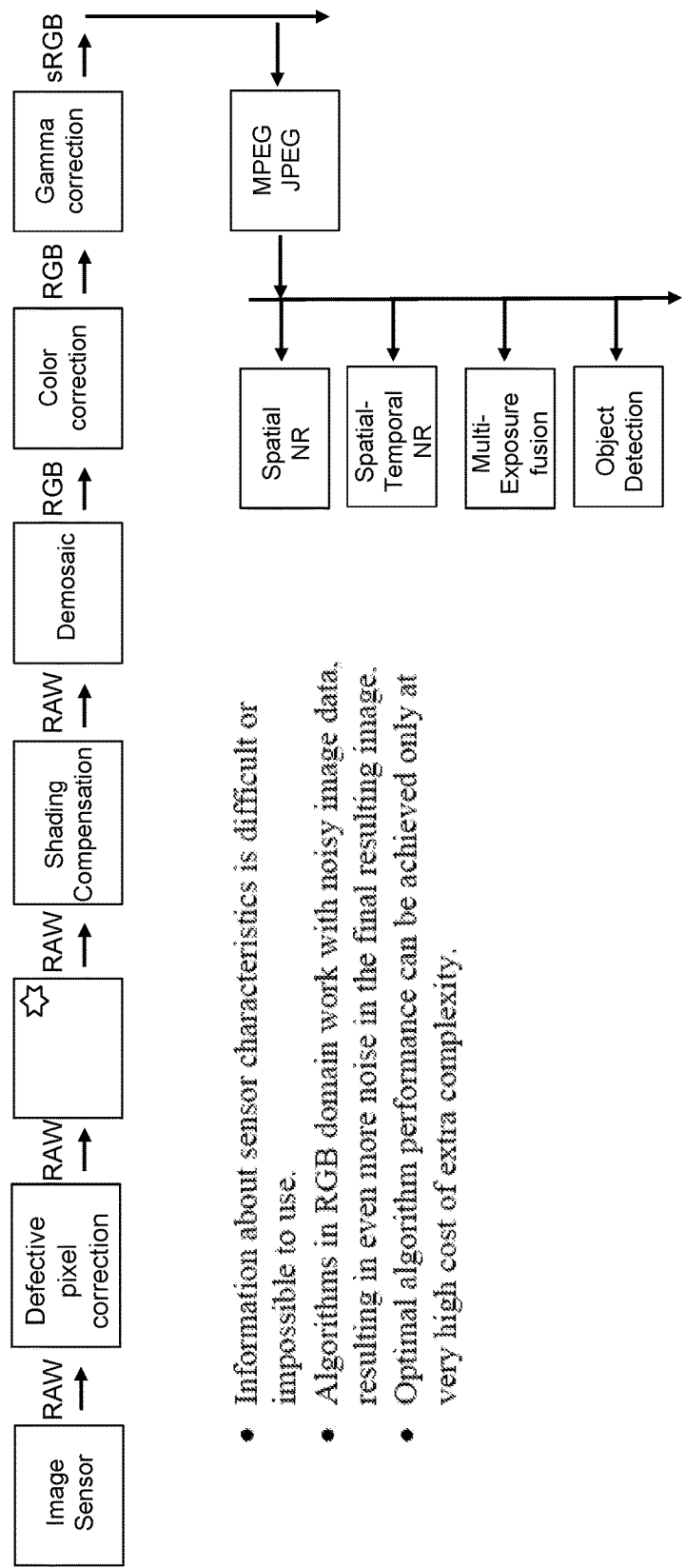
FIG. 3 shows an example of a traditional Image Processing Pipeline.

Image data, captured by the sensor is usually processed by a number of functional units, arranged in a chain of sequential processing blocks, named in literature as an Image Processing Pipeline (IPP). Each stage of the processing is performed by its corresponding block. An example of a traditional IPP is presented in FIG. 3.

In the above pipeline it is seen that some stages of processing are performed in the Bayer RAW data space, while some other processing is performed on RGB image data. It is important that starting from the de-mosaic block, processing of the data is performed by non-linear algorithms, making image intensity levels non-linearly distributed, thus braking linear dependencies between different regions in the image. The design image processing blocks, working in linear Bayer RAW data space, in order to benefit from the predictable nature of data, enabling the system to perform effective sensor noise modelling. The estimation of the noise characteristics for each image region can drastically improve the reliability of most image processing algorithms by providing a very reliable reference for any decision made by the algorithm's logic. However processing in the Bayer RAW data space will impose additional constraints and create some difficulties in algorithms design. We propose reliable, robust yet feasible solutions for algorithms that are practically implementable.

Figure 4:
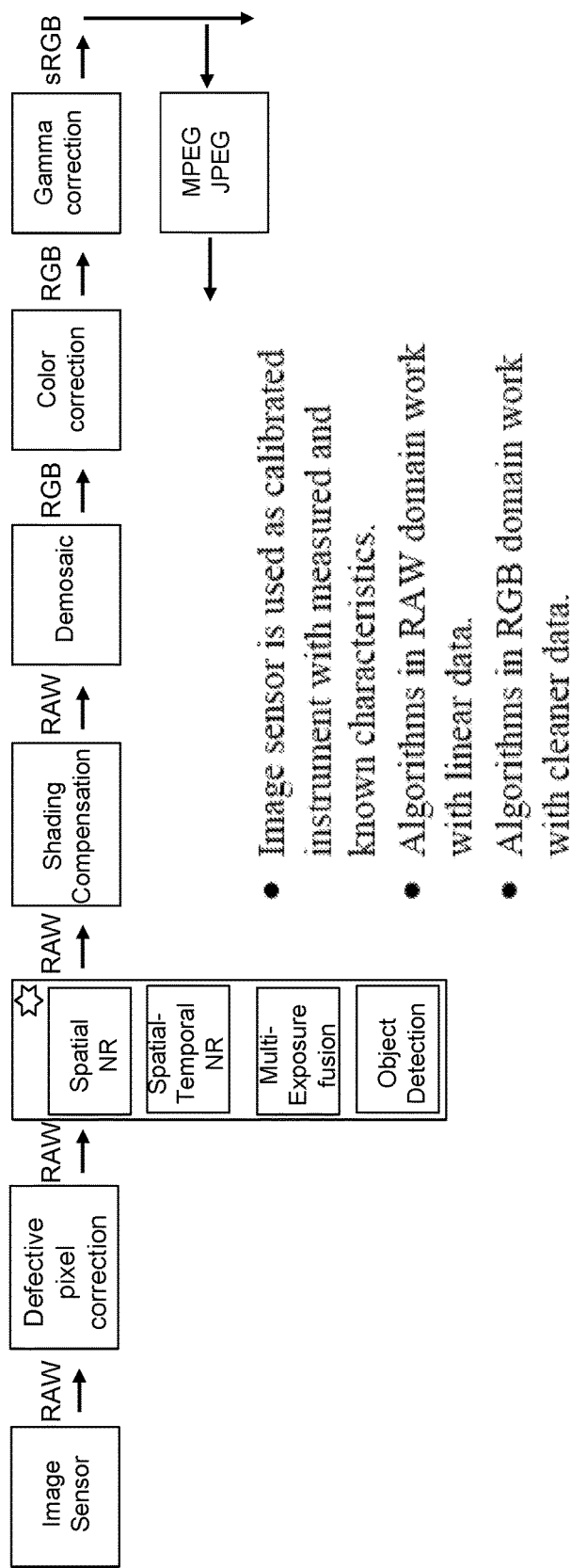
FIG. 4 shows an example of the block scheme of the proposed organization of Image Processing Pipeline.

The block scheme of proposed organization of IPP is presented in FIG. 4.

A Feature Extraction Model, Utilizing Histogram of Oriented Gradients

Figure 5:
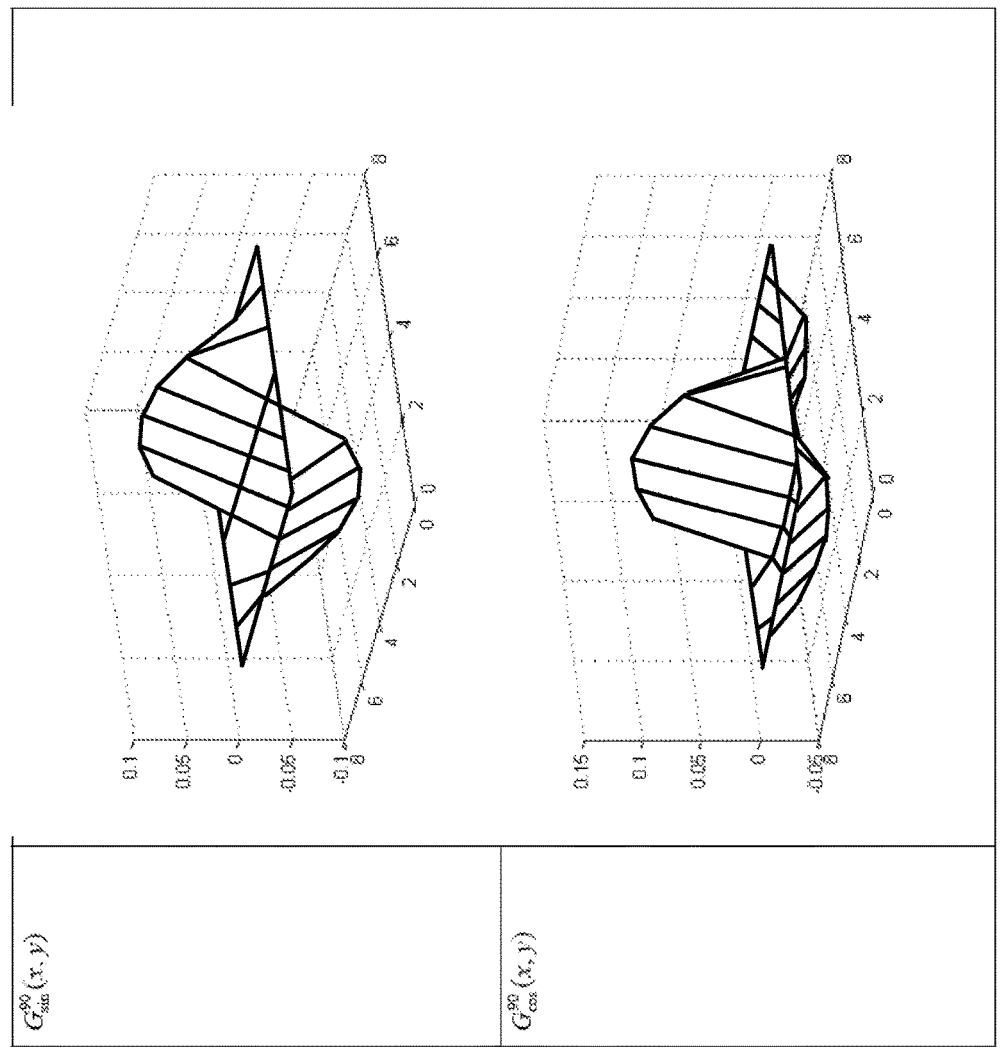
FIG. 5 shows plots of Gabor functions for an orientation of 90 degrees.

The first step in the calculation of Histogram of Oriented Gradients is edge detection. As opposed to the standard approach, edge kernels will be applied to linear data and the output will be normalised according to the expected noise. Gabor edge kernels with 6 different orientations were used in our experiments. The Gabor functions for an orientation of 90 degrees are presented in FIG. 5.

The response for one edge orientation would be calculated according to the equation (3):

$$E^\infty(x,y) = |\Sigma_{i,k \in K} G_{sin}^\infty(x+i,y+k) \times I(x+i,y+k)| + |\Sigma_{i,k \in K} G_{cos}^\infty(x+i,y+k) \times I(x+i,y+k)| \quad (3)$$

where K(i,k) is a spatial kernel of the Gabor function. Assuming that local details of an image I(x,y) at each coordinate were illuminated with a different intensity, the response $E^\infty(x,y)$ will significantly differ for bright and dark parts of the image. In the proposed object detection system, however, the interest is in some measure of reliability of detected edges. As the edge response was calculated in linear RAW data space, the response can be normalised by the expectation of noise at each pixel with coordinate x,y in the image.

Proposed Feature Normalization Method

In reference to the equation (2), the expectation of noise variance σ(x,y) for each image area I(x,y) can be matched. Further it should be considered that the edge detection kernels $G_{cos}^\infty(x,y)$ and $G_{sin}^\infty(x,y)$ are constructed as a linear combination of Gaussian function $G_K^\infty(x,y)$ and functions of sin(x) and cos(x). Thus the normalization of the edge response is performed according to the following equation (4):

$$E_{norm}^\infty(x,y) = \frac{E^\infty(x,y)}{\Sigma_{i,k \in K} \sigma(x+i,y+k) \times G_K(x+i,y+k)} \quad (4)$$

For the purpose of comparison the Edge response $E_{gamma}^\infty(x,y)$ was calculated according to the formula (5):

$$E_{gamma}^\infty(x,y) = |\Sigma_{i,k \in K} G_{sin}^\infty(x+i,y+k) \times I_g(x+i,y+k)| + |\Sigma_{i,k \in K} G_{cos}^\infty(x+i,y+k) \times I_g(x+i,y+k)| \quad (5)$$

Where $I_g(x,y)$ is a non-linear representation of I(x,y), obtained by the application of the nonlinear standard gamma function sRGB. $E_{norm}^\infty(x,y)$ and $e_{gamma}^\infty(x,y)$ were used for the comparison of the object detection algorithm's performance. The proposed edge response normalization approach demonstrates improved performance of object detection, operating in non-standard conditions, such as low-light, which is also important for sensors with non-standard noise characteristics. It is important to note also that the proposed scheme makes object detection independent from the settings of the image processing pipeline, which guarantees the best performance in embedded and mobile devices.

Experimental Results

In the experiments conducted a RGB sensor with a Bayer pattern was used. The sensor is typical for use within security, automotive and computer vision systems. The setup of the experiment consisted of the custom made camera system, allowing video capture in Bayer RAW format at full HD resolution and 25 frames per second. A firmly mounted camera system was used to record video in indoor conditions. The computer vision algorithm, trained to detect people was used for object detection. In one scenario feature extraction was done traditionally, i.e., without any knowledge about image sensor. In the second scenario extracted features were locally normalized by the sensor noise variance expectation. To evaluate the effectiveness of the proposed scheme, a number of experiments were conducted, capturing video sequences at different lighting conditions. As expected, the detection rate deteriorates as the noise within the image increases. Another observation is that the detection rate was higher in a system, where sensor noise characteristics were taken into account.

The statistics of the results of detections are presented in Table 1. People detection was performed under two categories: head and upper body (UB). Heads were detected using three classifiers, trained for three different poses. Upper body was detected using five classifiers, trained for five different poses, respectively. Strong detections refer to positive classifier responses larger than 0.4 and weak classifier responses refer to positive classifier responses between 0.1 and 0.4. People detections refer to a combined response from either of two categories. Formal detection rate is counted as the number of strong detections over the number of possible detections. A human object is considered to be detected if it has a strong detection in either category. The formal false positive rate is based on the ratio of strong incorrectly classified objects to the total number of objects to be detected.

TABLE 1

Detection rates statistical data.

|  | ISO-100 | | ISO-1600 | |
| --- | --- | --- | --- | --- |
|  | Sensor normalized | Gamma normalized | Sensor normalized | Gamma normalized |
| Heads detected | 635 | 634 | 593 | 565 |
| Heads strong | 620 | 607 | 568 | 524 |
| Heads weak | 15 | 27 | 25 | 43 |
| Heads missed | 0 | 1 | 31 | 57 |
| UB detected | 631 | 631 | 612 | 598 |
| UB strong | 617 | 602 | 581 | 561 |
| UB weak | 14 | 29 | 31 | 37 |
| UB missed | 0 | 0 | 2 | 16 |
| False positives | 0 | 0 | 4 | 21 |
| Missed people | 0 | 0 | 2 | 16 |
| Track errors | 0 | 1 | 1 | 1 |
| Formal people detection rate | 100.00% | 99.84% | 99.76% | 97.06% |
| Formal heads detection rate | 97.64% | 95.59% | 91.01% | 83.97% |
| Formal UB detection rate | 97.78% | 95.40% | 94.62% | 91.36% |
| Formal false positives rate | 0% | 0% | 0.32% | 1.69% |

It can be seen that the normalization according to the sensor noise model that implements this invention significantly improves detection rate and reduces false positives rate, which is more prominent at higher ISO settings.

The response from the edge detector is cleaner after the normalization compared to the response from the standard edge detector which was running on gamma corrected data. The improved system response in the presence of noise improves the results of object detection, the results of which are presented in Table 1. It is a fair statement that a similar effect can be achieved by using noise reduction techniques. However achieving a noise free output from the edge detectors by performing the sensor noise modelling is a more efficient way of improving the system performance.

Conclusion

The proposed method of edge detectors response normalization was successfully used in an object detection engine, implemented in hardware. The details of the object detection engine implemented in Xilinx Zynq 7045 FPGA are presented in Table 2 below:

TABLE 2

Object detection system resource utilization

| Resource | Utilization | Available | Utilization % |
| --- | --- | --- | --- |
| FF | 151193 | 437200 | 34.6 |
| LUT | 103865 | 218600 | 47.5 |
| Memory LUT | 259 | 70400 | 0.4 |
| BRAM | 197 | 545 | 36.1 |
| DSP48 | 734 | 900 | 81.6 |

TABLE 2-continued

Object detection system resource utilization

| Resource | Utilization | Available | Utilization % |
| --- | --- | --- | --- |
| BUFG | 5 | 32 | 15.6 |
| MMCM | 0 | 8 | 0.0 |

The proposed edge detection improvements achieve better object detection performance comparing to other known systems. The proposed method of edge detector response normalization also allowed running an object detection engine on sensor RAW data. It can be noted that the proposed method can allow object detection system implementation without the IPP being involved, which reduces the overall cost of the system and can be beneficial when the actual image from the object detection system is not required for a privacy reasons.

The method of edge filter output normalization according to modelled sensor noise can also be generalized and used to improve the response of local binary pattern feature extraction algorithms. It is a known issue with local binary patterns (LBP) that their resilience to noise is weaker than in edge segmentation methods. The modelling of the sensor noise may also be used to improve the reliability of local pattern detection and consequently the quality of machine vision algorithms.

The invention may result in a number of practical algorithmic implementations, making products where these algorithms were included more competitive and of better quality practically.

Applications are wide and include, but are not limited to:
Smartphones
Computer vision systems
Objects recognition systems
Human detection systems
Facial recognition systems
Scene interpretation systems
Image classification systems
Image captioning systems
Autonomous vehicle computer vision systems
Robotics computer vision systems

REFERENCES

1. Antoni Buades, Bartomeu Coll and Jean-Michel Morel, "Nonlocal image and movie denoising" International Journal of Computer Vision Vol. 76, Number 2, 123-139, (2008).
2. Ce Liu, William T. Freeman "A High-Quality Video Denoising Algorithm based on Reliable Motion Estimation", European Conference on Computer Vision (2010).
3. Ren Ying, Chua Chin-Seng, Ho Yeong-Khing, "Statistical background modeling for non-stationary camera". Pattern Recognition Letters, 24, 183-196. (2002).
4. Sheikh Y., Shah M., "Bayesian modeling of dynamic scenes for object detection". IEEE transactions on pattern analysis and machine intelligence, 27(11), 1778-92, (2005).
5. I. V. Romanenko, E. A. Edirisinghe, D. Larkin, "Block matching noise reduction method for photographic images applied in Bayer RAW domain and optimized for real-time implementation", Proceedings of SPIE Vol. 8437, 84370F (2012).
6. Moctezuma, D.; Conde, C.; de Diego, I. M.; Cabello, E., "Person detection in surveillance environment with HoGG: Gabor filters and Histogram of Oriented Gradient," Computer Vision Workshops (ICCV Workshops), 2011 IEEE International Conference on, vol., no., pp. 1793, 1800, 6-13 Nov. (2011).
7. N. Dalal, B. Triggs, "Histograms of oriented gradients for human detection", in: CVPR, pp. 886-893, (2005).
8. W. Jiang, K.-M. Lam, T. Shen, "Efficient edge detection using simplified Gabor wavelets", IEEE Trans. Syst. Man Cybern. Part B 39 (4) 1036-1047, (2009).
9. V. Kruger, G. Sommer, "Gabor wavelet networks for efficient head pose estimation", Image Vision Comput. 20 (9-10) 665-672, (2002).
10. Q. Zhu, M.-C. Yeh, K.-T. Cheng, S. Avidan, "Fast human detection using a cascade of histograms of oriented gradients", in: CVPR, pp. 1491-1498, (2006).
11. Foi A. M., Trimeche V., Katkovnik, K. Egiazarian, "Practical Poissonian-Gaussian noise modeling and fitting for single image raw-data", IEEE Transactions on Image Processing Vol. 17, (2008).
12. Liu, C., W. T. Freeman, R. Szeliski, and S. B. Kang, "Noise estimation from a single image", Proc. IEEE Conf. Computer Vision and Pattern Recognition, CVPR 2006, pp. 901-908, (2006).
13. Blanksby, A. J., M. J. Loinaz, D. A. Inglis, and B. D. Ackland, "Noise performance of a color CMOS photogate image sensor", IEEE Int. Electron Devices Meeting 97 Tech. Dig., pp. 205-208, 1997.
14. Vladimir S. Petrovic, Costas S. Xydeas, "Sensor noise effects on signal-level image fusion performance", Information Fusion-INFFUS, vol. 4, no. 3, pp. 167-183, 2003.

NOTE

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A method of extracting a feature from an image, the method comprising performing, in a processor or circuitry, steps of:
receiving a digital image from a sensor;
demosaicing the digital image;
prior to demosaicing the digital image, taking an input image from the digital image for feature extraction; and
performing feature extraction on the input image, wherein the step of performing feature extraction comprises:
using a model or profile of noise comprising a variance of the noise in the sensor in defined areas of the input image to normalize a response of a feature extraction algorithm;
applying the feature extraction algorithm to the input image; and
for each pixel of the input image:
calculating an edge response for an orientation, and normalizing the edge response for the orientation by taking into account the variance in the noise in the sensor.

2. The method of claim 1, wherein the feature is an edge.
3. The method of claim 2, wherein the feature extraction is based on detection of the edge.
4. The method of claim 1, wherein the feature is a local binary pattern.
5. The method of claim 1, wherein the method is implemented in a system that is not part of, does not use, or is not downstream of, an image processing pipeline.
6. The method of claim 1, wherein the method operates operating in a RAW domain with linear data.
7. The method of claim 1, wherein the edge response is calculated by convoluting a filter kernel with an intensity of the input image.
8. The method of claim 7, wherein the filter kernel is a Gabor filter kernel or a Convolutional Neural Network filter kernel.
9. The method of claim 1, in which the normalizing of the edge response for an orientation $\propto$ is calculated for each pixel (x,y) in the input image from:

$$E_{norm}^{\propto}(x, y) = \frac{E^{\propto}(x, y)}{\Sigma_{i,k \in K} \sigma(x+i, y+k) \times G_K(x+i, y+k)}$$

wherein the response $\hat{E}^{\propto}(x,y)$ is calculated from $$E^{\propto}(x,y) = |\Sigma_{i,k \in K} G_{sin}{}^{\propto}{}_{(x+i,y+k)} \times I(x+i,y+k)| + |\Sigma_{i,k \in K} G_{cos}{}^{\propto}{}_{(x+i,y+k)} \times I(x+i,y+k)|$$

10. The method of claim 1, wherein the input image is RAW image sensor data.
11. The method of claim 1, wherein the edge response is fed into a linear classifier comprising a Support Vector Machine or into a classification layer of a Convolutional Neural Network.
12. The method of claim 1, wherein the method is implemented in real-time.
13. The method of claim 1, wherein the method operates as a part of a computer vision system, applied to posture detection, people detection, object detection in the digital image.
14. The method of claim 1, wherein the method is utilized in one of the following: Smartphone; Computer vision systems; Objects recognition systems; Human detection systems; Facial recognition systems; Scene interpretation systems; Image classification systems; Image captioning systems; Autonomous vehicle computer vision systems; Robotics computer vision systems.
15. The method of claim 1, wherein the method is implemented in an embedded hardware block.
16. Image processing hardware configured to:
receive a digital image from a sensor;
demosaic the digital image;
prior to demosaicing the digital image, take an input image from the digital image for feature extraction; and
perform feature extraction on the input image, wherein the step of performing feature extraction comprises:
using a model or profile of noise comprising a variance of the noise in the sensor in defined areas of the input image to normalize a response of a feature extraction algorithm;
applying the feature extraction algorithm to the input image; and
for each pixel of the input image:
calculating an edge response for an orientation, and normalizing the edge response for the orientation by taking into account the variance in the noise in the sensor.

17. A device including image processing hardware configured to:
  receive a digital image from a sensor;
  demosaic the digital image;
  prior to demosaicing the digital image, take an input image from the digital image for feature extraction; and
  perform feature extraction on the input image, wherein the step of performing feature extraction comprises:
    using a model or profile of noise in the sensor to normalize a response of a feature extraction algorithm;
    applying the feature extraction algorithm to the input image; and
    for each pixel of the input image;
      calculating an edge response for an orientation, and
      normalizing the edge response for the orientation by taking into account the variance in the noise in the sensor.

18. The device of claim 17, wherein the device comprises or is a part of one of the following: Smartphone; Computer vision system; Objects recognition system; Human detection system; Facial recognition system; Scene interpretation system; Image classification system; Image captioning system; Autonomous vehicle computer vision system; Robotics computer vision system.

* * * * *